(12) United States Patent
Choi

(10) Patent No.: US 11,695,285 B2
(45) Date of Patent: Jul. 4, 2023

(54) SECONDARY BATTERY

(71) Applicant: SAMSUNG SDI CO., LTD., Yongin-si (KR)

(72) Inventor: Jaehyuk Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 272 days.

(21) Appl. No.: 17/115,913

(22) Filed: Dec. 9, 2020

(65) Prior Publication Data

US 2021/0179624 A1    Jun. 17, 2021

(30) Foreign Application Priority Data

Dec. 11, 2019    (KR) .................. 10-2019-0164640

(51) Int. Cl.
*H02J 7/00* (2006.01)
*B60L 50/15* (2019.01)

(52) U.S. Cl.
CPC ............ *H02J 7/0042* (2013.01); *B60L 50/15* (2019.02); *H02J 7/0029* (2013.01)

(58) Field of Classification Search
CPC ........................................................ H02J 7/00
See application file for complete search history.

(56) References Cited

U.S. PATENT DOCUMENTS

| 6,861,821 | B2 | 3/2005 | Masumoto et al. |
| 8,691,425 | B2 * | 4/2014 | Yoon ............ H01M 10/0525 |
| | | | 429/177 |
| 8,956,749 | B2 | 2/2015 | Kim |
| 9,093,723 | B2 | 7/2015 | Byun |
| 10,069,119 | B2 | 9/2018 | Kwon et al. |
| 10,263,238 | B2 | 4/2019 | Hwang et al. |
| 2014/0038031 | A1 | 2/2014 | Yong et al. |

FOREIGN PATENT DOCUMENTS

| JP | 2007-280813 A | 10/2007 |
| JP | 5177490 B2 | 5/2009 |
| KR | 10-0686815 B1 | 2/2007 |
| KR | 10-0826069 B1 | 4/2008 |
| KR | 10-0965711 B1 | 6/2010 |
| KR | 10-2012-0047542 A | 5/2012 |
| KR | 10-2013-0138109 A | 12/2013 |
| KR | 10-2014-0019927 A | 2/2014 |
| KR | 10-1479306 B1 | 1/2015 |
| KR | 10-2016-0064897 A | 6/2016 |
| KR | 10-2018-0127240 A | 11/2018 |
| KR | 10-2018-0137313 A | 12/2018 |

OTHER PUBLICATIONS

Korean Office action dated Sep. 5, 2022.

* cited by examiner

*Primary Examiner* — Robert Grant
(74) *Attorney, Agent, or Firm* — Lee IP Law, P.C.

(57) ABSTRACT

A secondary battery includes a protection module package including a tab bridge, an input/output terminal, and an insulating body that includes a middle block and side block, the middle block having the input/output terminal therein, the side block being spaced apart from the middle block, and the tab bridge connecting the middle block to the side block; and a bare cell including an electrode that is electrically connected to the tab bridge.

32 Claims, 12 Drawing Sheets

SECONDARY BATTERY

CROSS-REFERENCE TO RELATED APPLICATION

Korean Patent Application No. 10-2019-0164640, filed on Dec. 11, 2019, in the Korean Intellectual Property Office, and entitled: "Secondary Battery," is incorporated by reference herein in its entirety.

BACKGROUND

1. Field

Embodiments relate to a secondary battery.

2. Description of the Related Art

In general, secondary batteries are rechargeable, unlike primary batteries. Secondary batteries may be used as energy sources for mobile devices, electric vehicles, hybrid vehicles, electric bicycles, uninterruptible power supplies, or the like, and depending on the types of external devices to which they are applied, the secondary batteries may be used in the form of a single battery or in the form of a battery module in which a plurality of batteries are connected and combined into one unit.

A small mobile device such as a mobile phone may operate for a certain time according to the output and capacity of a single battery; however, in the case of long-time driving or high-power driving such as in the case of an electric vehicle or a hybrid vehicle with high power consumption, a battery module including a plurality of batteries may be used due to output and capacity issues, and the battery module may increase the output voltage or the output current according to the number of built-in batteries.

SUMMARY

Embodiments are directed to a secondary battery, including: a protection module package including a tab bridge, an input/output terminal, and an insulating body that includes a middle block and side block, the middle block having the input/output terminal therein, the side block being spaced apart from the middle block, and the tab bridge connecting the middle block to the side block; and a bare cell including an electrode that is electrically connected to the tab bridge.

The side block may include first and second side blocks that are respectively spaced apart from the middle block on a first side of the middle block and a second side of the middle block that is opposite the first side, the tab bridge may be formed of a different material from the insulating body, and may include a first tab bridge connecting the middle block to the first side block, and a second tab bridge connecting the middle block to the second side block, and the first and second tab bridges may be electrically connected to respective electrodes of the bare cell that have different polarities.

The input/output terminal may be disposed at a central position along a lengthwise direction of the protection module package or the insulating body.

The insulating body may include an upper surface with the input/output terminal thereon, a lower surface disposed opposite the upper surface, and a side surface connecting the upper surface to the lower surface and forming a circumference of the insulating body.

The input/output terminal may be exposed at the upper surface of the insulating body.

The tab bridge may include: a fixing piece extending across the insulating body between the upper surface and the lower surface of the insulating body; and a connection piece that is bent from the fixing piece, the connection piece being connected to the electrode across the side surface of the insulating body.

The connection piece may be arranged to overlap the electrode at a portion of the electrode that is bent onto a terrace portion of the bare cell, and the connection piece may be bent to surround the lower surface of the insulating body across the side surface of the insulating body.

The fixing piece may include a portion buried in the insulating body.

The fixing piece may be exposed through a gap between the middle block and the side block, and may extend across the middle block and the side block.

The tab bridge may further include a reinforcement piece that is bent from the fixing piece toward a side surface of the insulating body that is opposite to the connection piece.

The reinforcement piece may extend across a gap between the middle block and the side block.

The connection piece may extend longer across the side surface of the insulating body than does the reinforcement piece, and reinforcement piece may not extend beyond the side surface of the insulating body.

The insulating body may include a curved portion, the curved portion being disposed at a corner of a first side portion of the middle block at the side block, the first side portion and the side block facing each other with a gap defining a space therebetween.

The curved portion may smoothly connect the first side portion to a second side portion adjacent to the first side portion, and a distance from an intersection point formed on an extension line of the first side portion and the second side portion to the first side portion may be shorter than a distance from the intersection point to the second side portion.

A portion of the tab bridge may be exposed through a gap between the middle block and the side block, and a modification hole for suppressing transmission of a torsional moment between the middle block and the side block may be located in the portion of the tab bridge that is exposed through the gap.

A circuit portion forming a charge/discharge path between the tab bridge and the input/output terminal may be at least partially buried in the middle block.

A component forming a charge/discharge path may not be arranged in the side block except for the tab bridge.

An engraved pattern may be formed in the middle block, the engraved pattern being engraved in a depthwise direction from a lower surface opposite to the input/output terminal.

The engraved pattern may be formed in the depthwise direction from a lower surface of the middle block toward an upper surface of the middle block where the input/output terminal is formed, or may be formed in the depthwise direction from a lower surface of the middle block toward a circuit portion connected to the input/output terminal.

The engraved pattern may include: a longitudinal portion extending parallel to a lengthwise direction of the middle block; a transverse portion extending across the longitudinal portion in a direction intersecting with the longitudinal portion; and an isolated protrusion surrounded by the longitudinal portion and the transverse portion.

The engraved pattern may include an inclined side surface formed as an opening width thereof decreases gradually along the depthwise direction.

The middle block may include a central thick portion in which the input/output terminal is formed and which is formed with a relatively large thickness; and a pair of thin portions formed with a relatively small thickness on both sides of the thick portion.

The side block may include: a thin portion formed with a relatively small thickness; and a thick portion formed with a relatively large thickness outside the thin portion.

A connection piece of the tab bridge may be connected to the thin portions of the middle block and the side block, and the thin portions of the middle block and the side block may be formed at adjacent positions.

The thick portion and the thin portion of the middle block may include lower surfaces stepped with respect to each other, first and second engraved patterns may be formed at the lower surfaces of the thick portion and the thin portion, the first and second engraved patterns being engraved in the depthwise direction in the middle block, and the first and second engraved patterns may be disconnected from each other.

The secondary battery may further comprise a flexible circuit board arranged on the insulating body and connected to the input/output terminal.

A conductive recess of the flexible circuit board and the input/output terminal may be aligned with each other and may be electrically connected to each other with a soldering material therebetween.

The flexible circuit board may extend from one side of the input/output terminal to another side of the input/output terminal so as to cross the input/output terminal along a lengthwise direction of the insulating body, and the flexible circuit board may include: a conductive pattern electrically connected to the input/output terminal at one side of the input/output terminal; and a dummy pattern not electrically connected to the input/output terminal at another side of the input/output terminal.

The middle block may include a centrally located thick portion in which the input/output terminal is disposed and which is formed with a relatively large thickness, the middle block may include a pair of thin portions formed with a relatively small thickness on opposite sides of the thick portion, the conductive pattern may extend across one of the thin portions on one side of the thick portion, and the dummy pattern may be arranged on the other of the thin portions on another side of the thick portion.

At least a portion of the dummy pattern and a corresponding thin portion directly may face each other through an opening of an insulating sheet.

A plurality of through holes may be formed in the dummy pattern.

BRIEF DESCRIPTION OF THE DRAWINGS

Features will become apparent to those of skill in the art by describing in detail example embodiments with reference to the attached drawings in which:

FIGS. 10 and 11 are views for describing a modified embodiment, wherein FIG. 10 is a perspective view of a protection module package and FIG. 11 is a cross-sectional view of the protection module package taken along line XI-XI of FIG. 10; and FIGS. 12 and 13 are views for describing a modified embodiment, wherein FIG. 12 is a perspective view of a protection module package and FIG. 13 is a cross-sectional view of the protection module package taken along line XIII-XIII of FIG. 12.

DETAILED DESCRIPTION

Figure 1:
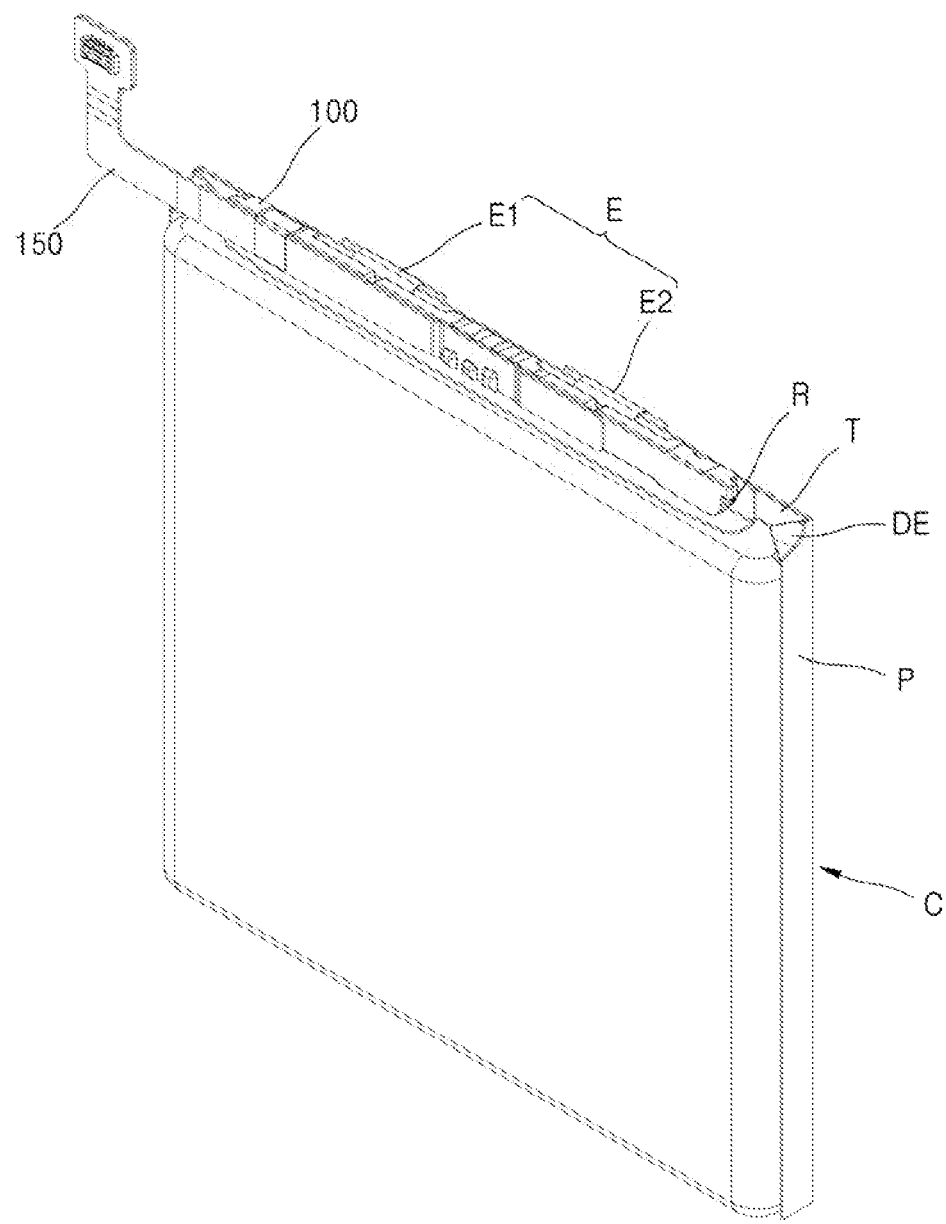
FIG. 1 is a perspective view of a secondary battery according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, secondary batteries according to example embodiments will be described with reference to the accompanying drawings.

Figure 2:
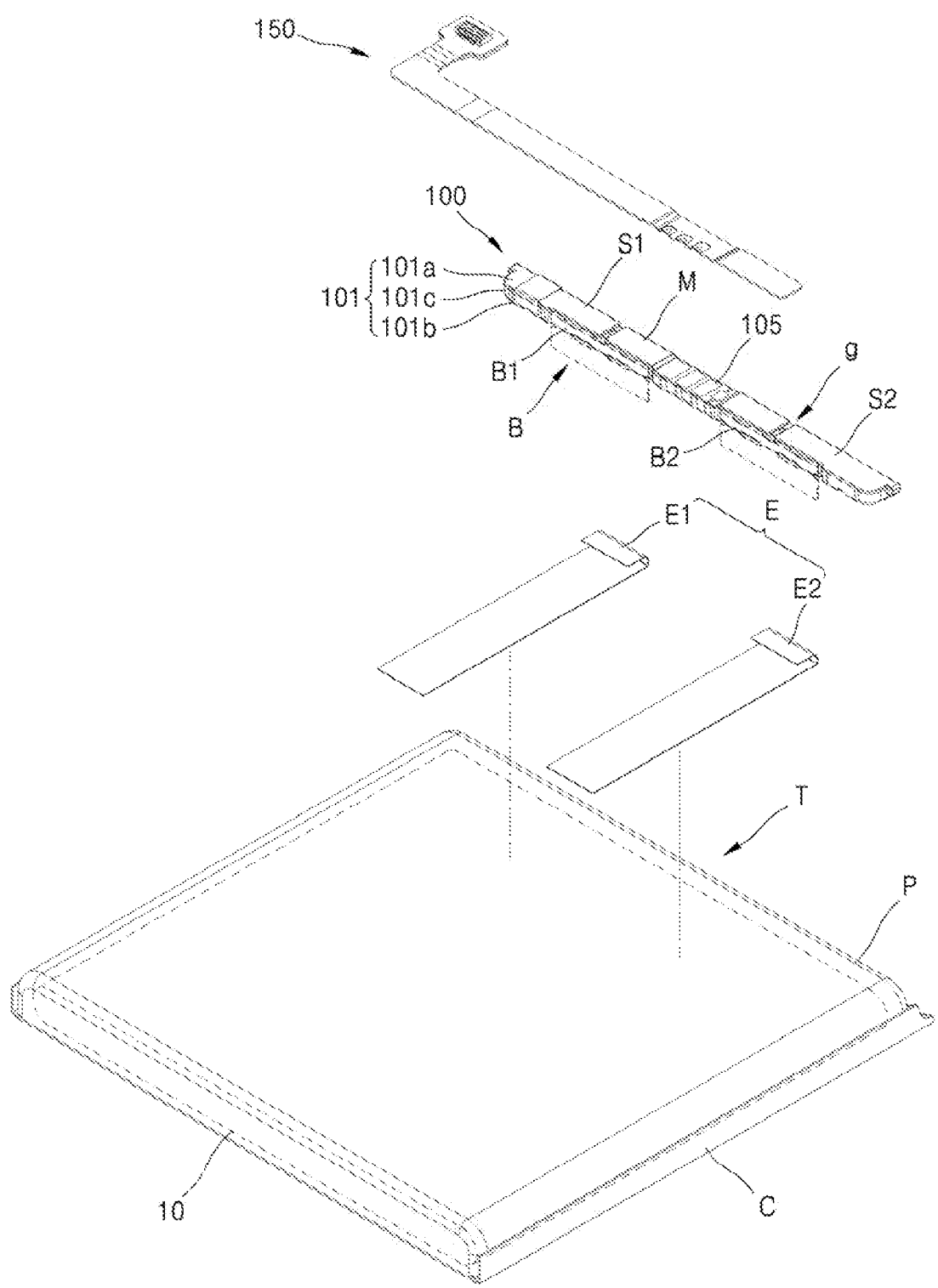
FIG. 2 is an exploded perspective view of the secondary battery illustrated in FIG. 1.
Figure 3A:
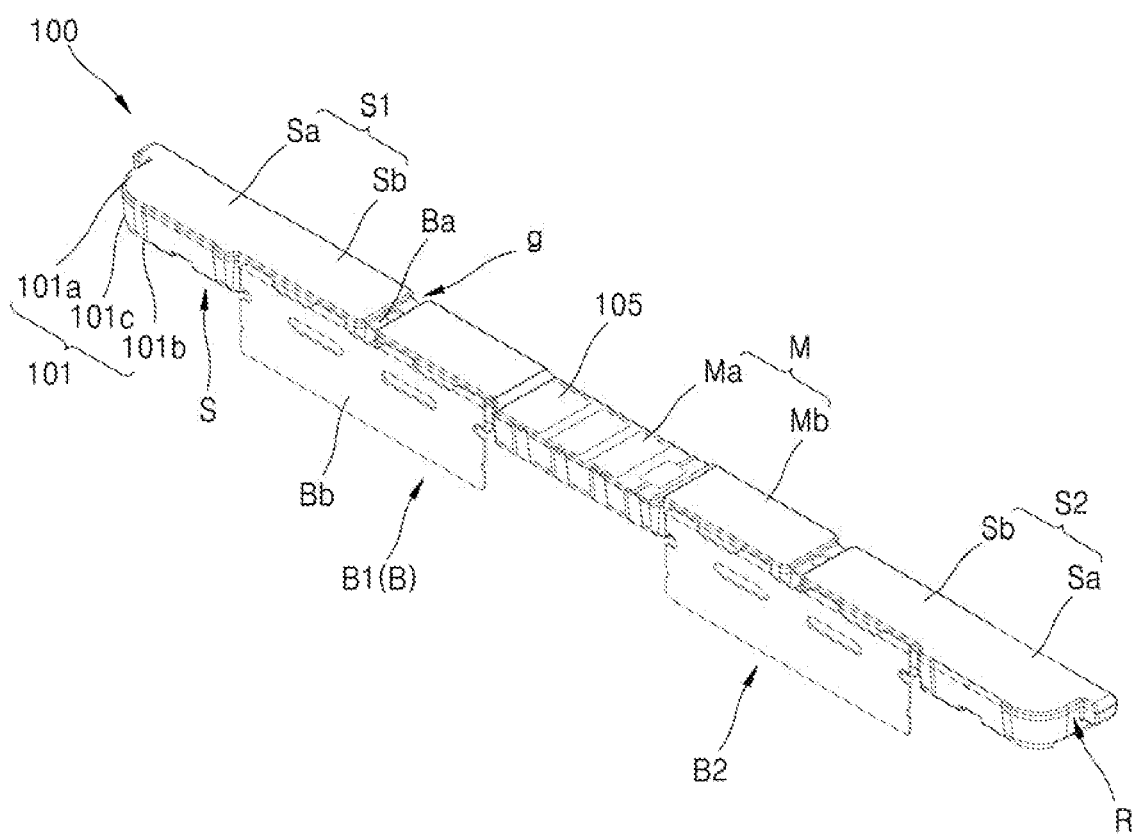
FIGS. 3A and 3B are respectively a perspective view and an exploded perspective view of a protection module package illustrated in FIG. 1.
Figure 3B:
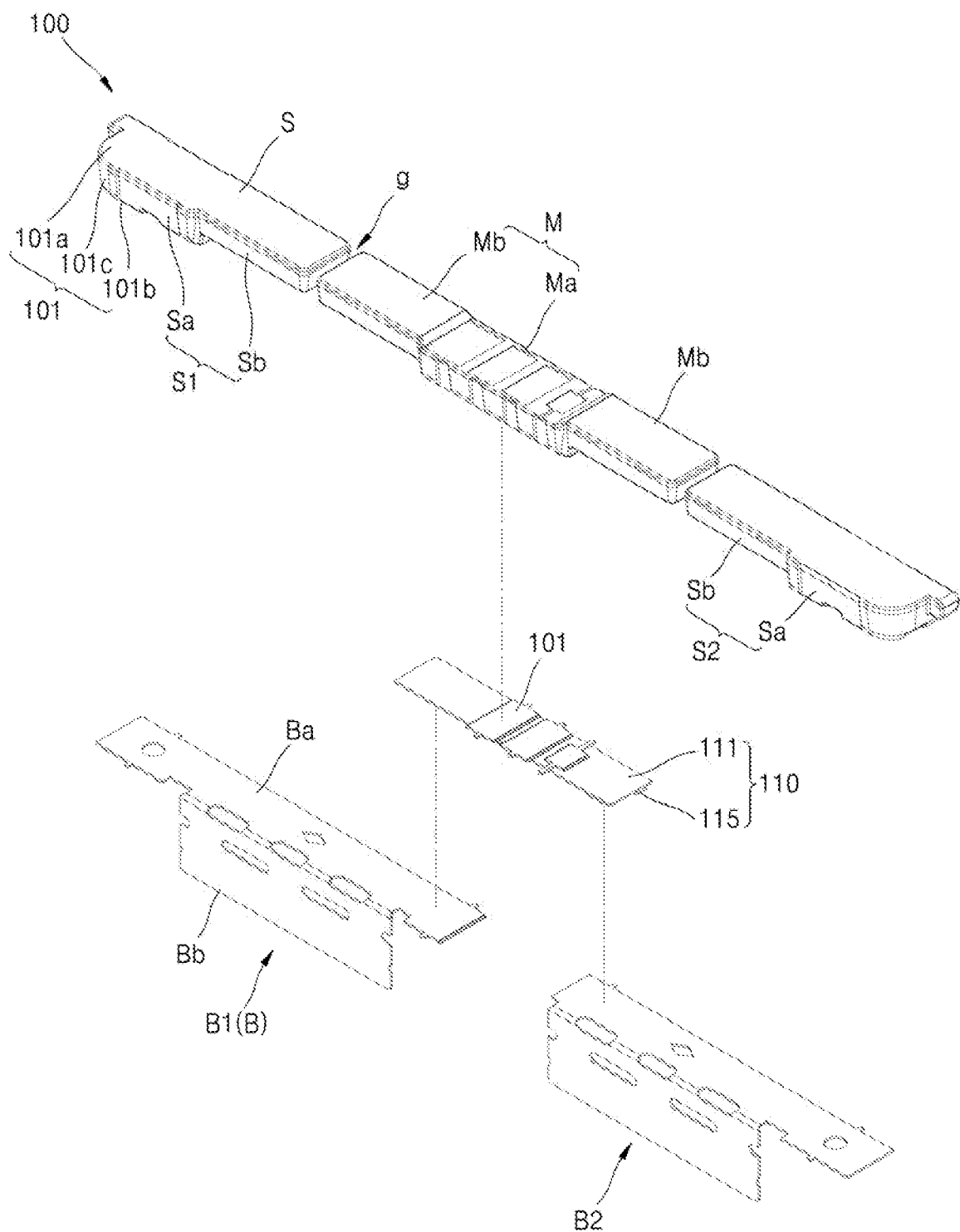
Figure 4:
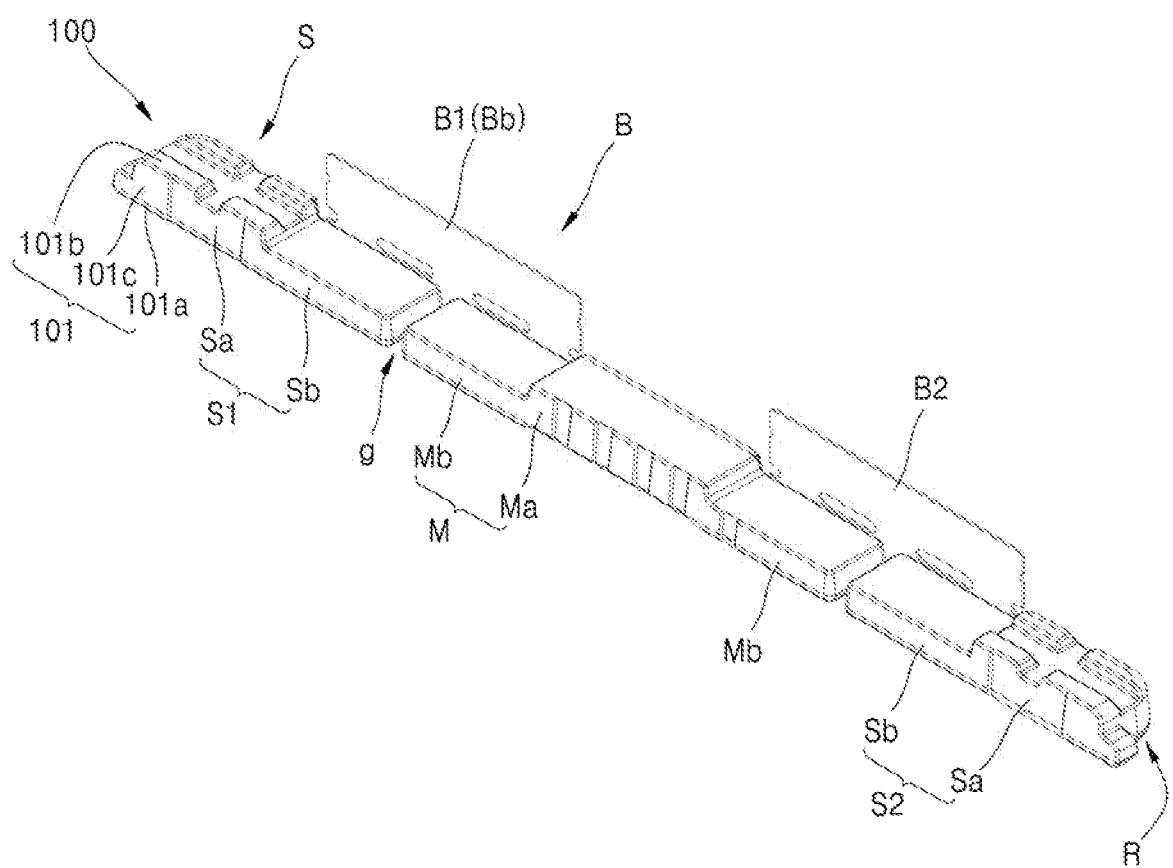
FIG. 4 is another perspective view of the protection module package illustrated in FIG. 3A.
Figure 5:
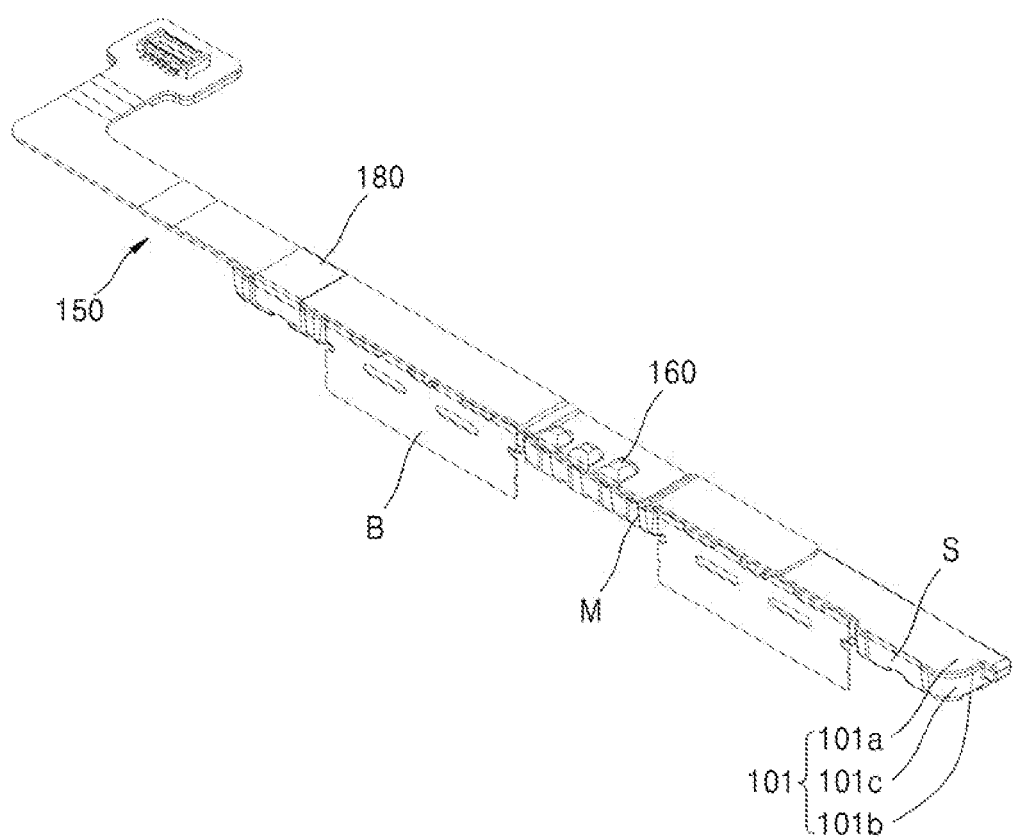
FIGS. 5 and 6 are views illustrating the connection between a flexible circuit board and the protection module package illustrated in FIG. 3A.
Figure 6:
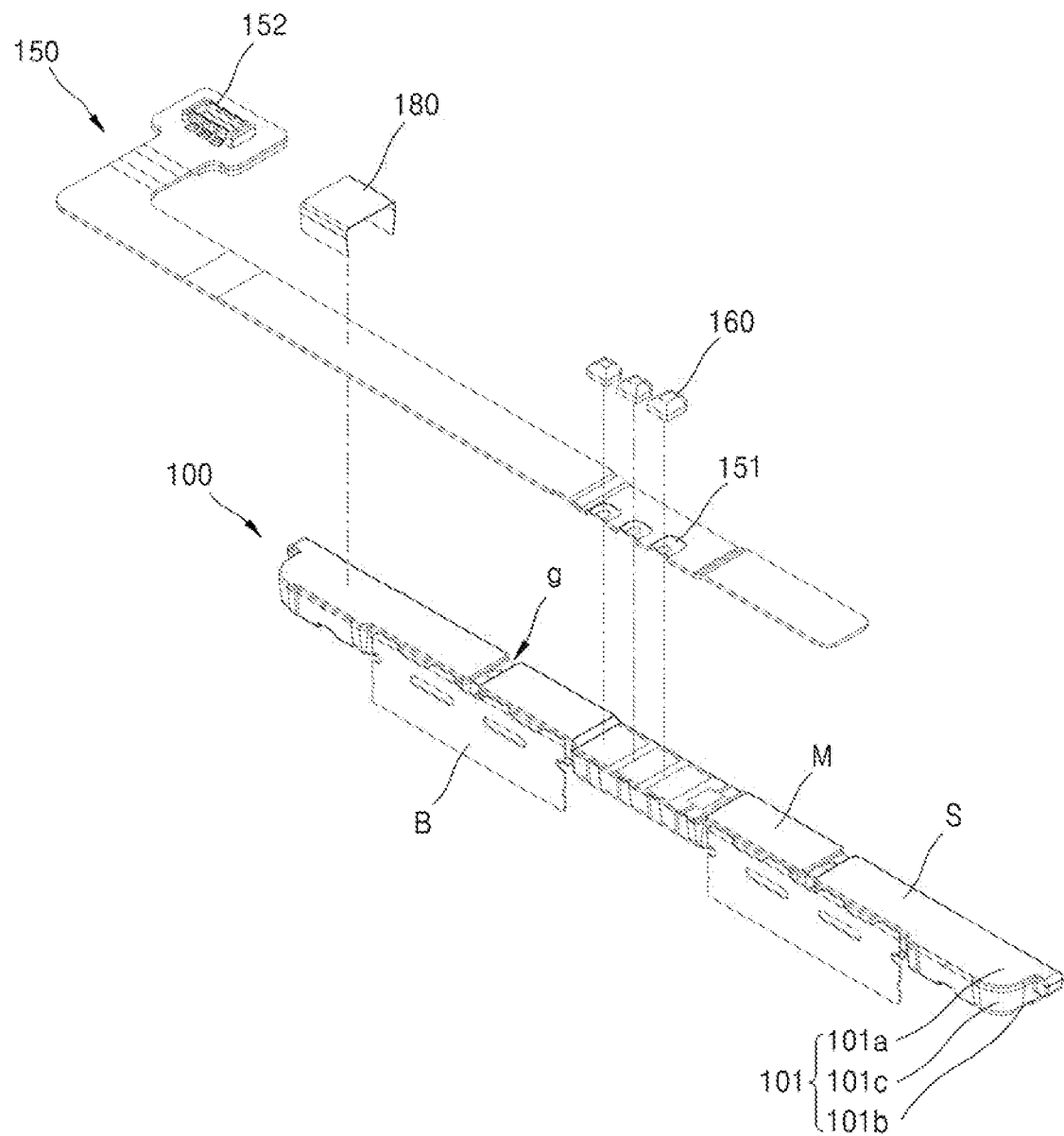
Figure 7:
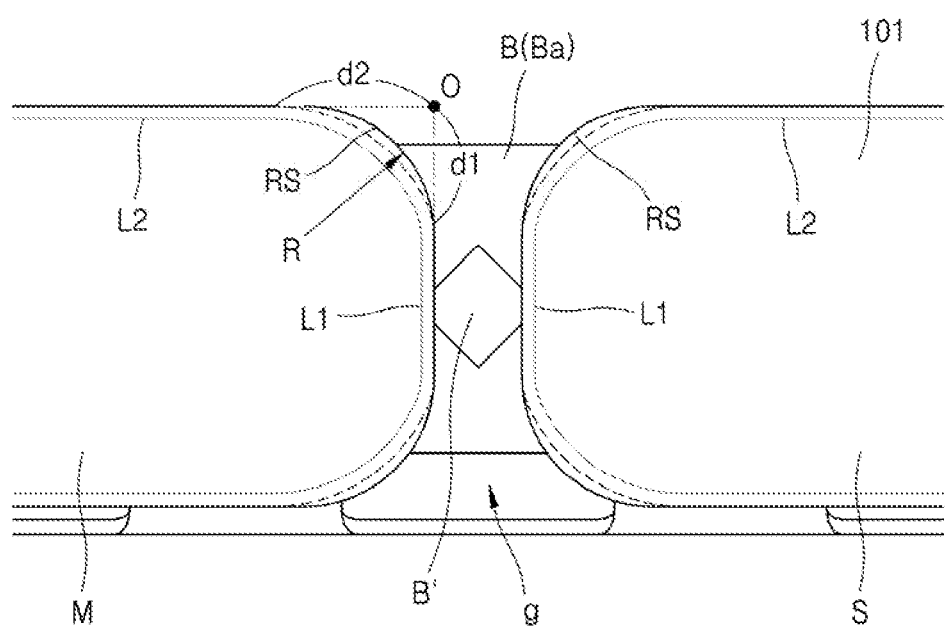
FIG. 7 is a view illustrating a portion of the protection module package illustrated in FIG. 3A.
Figure 8:
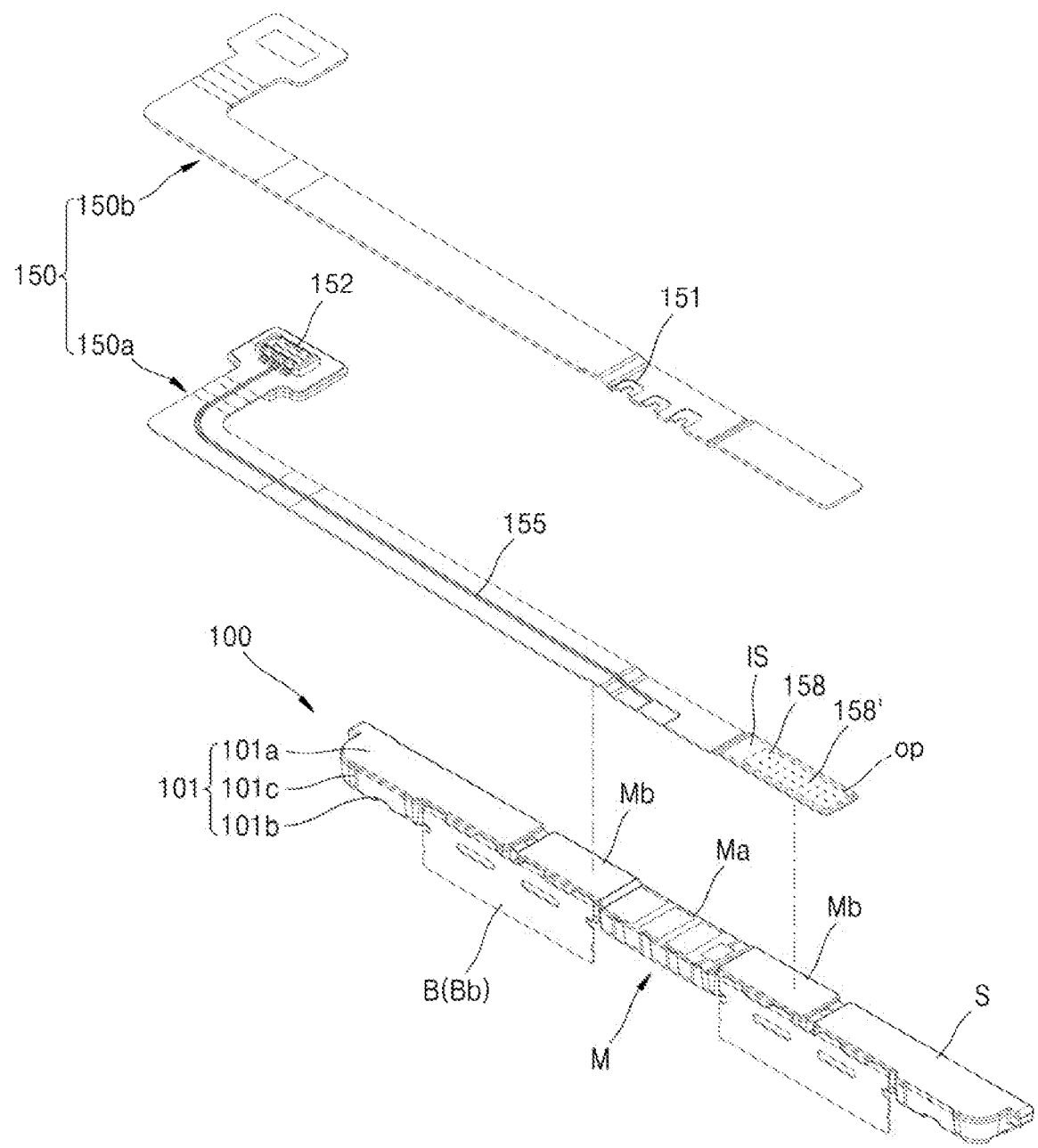
FIG. 8 is an exploded perspective view of the flexible circuit board illustrated in FIG. 6.
Figure 9:
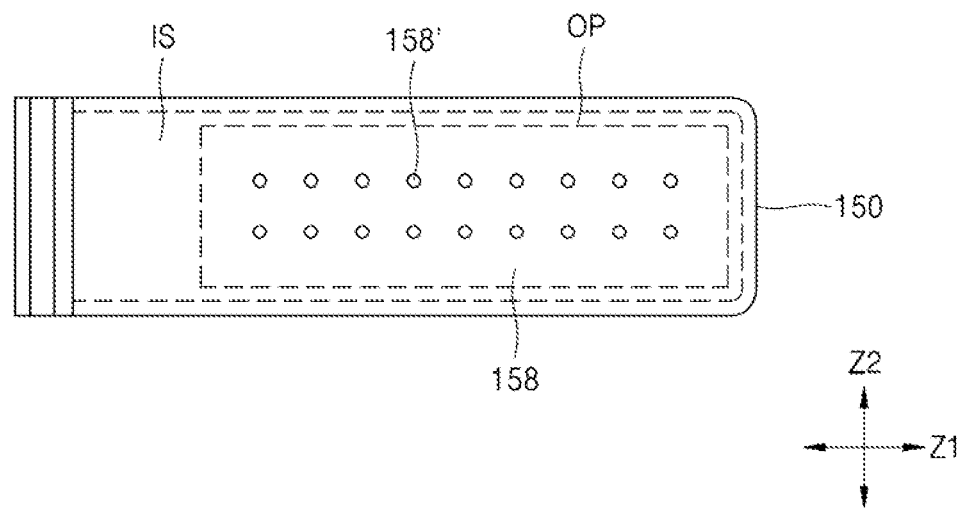
FIG. 9 is a view illustrating a portion of the flexible circuit board illustrated in FIG. 8.

FIG. 1 is a perspective view of a secondary battery according to an example embodiment. FIG. 2 is an exploded perspective view of the secondary battery illustrated in FIG. 1. FIGS. 3A and 3B are respectively a perspective view and an exploded perspective view of a protection module package illustrated in FIG. 1. FIG. 4 is another perspective view of the protection module package illustrated in FIG. 3A. FIGS. 5 and 6 are views illustrating the connection between a flexible circuit board and the protection module package illustrated in FIG. 3A. FIG. 7 is a view illustrating a portion of the protection module package illustrated in FIG. 3A. FIG. 8 is an exploded perspective view of the flexible circuit board illustrated in FIG. 6. FIG. 9 is a view illustrating a portion of the flexible circuit board illustrated in FIG. 8.

Referring to FIGS. 1 and 2, the secondary battery may include a bare cell C and a protection module package 100 that is electrically connected to the bare cell C.

The bare cell C may include an electrode assembly 10, an exterior material P surrounding the electrode assembly 10, and an electrode E that is drawn from the exterior material P. Although not illustrated in the drawings, the electrode assembly 10 may be formed in a winding type in which first and second electrode plates and a separator located between the first and second electrode plates are wound in a roll form, or may be formed in a stacking type in which first and second electrode plates and a separator are stacked on each other. The first and second electrode plates of the electrode assembly 10 may be electrically connected to the outside of the exterior material P through the electrode E of the bare cell C, and the electrode E of the bare cell C may include a first electrode E1 and a second electrode E2 of different polarities that are respectively electrically connected to the first and second electrode plates of the electrode assembly 10. The electrode E may be drawn out through a terrace portion T of the bare cell C and may be electrically connected to the protection module package 100 as described below. The exterior material P may be formed to surround the electrode assembly 10, and a sealing portion for sealing the electrode assembly 10 may be formed by sealing the remaining portion of the exterior material P remaining after surrounding the electrode assembly 10. For example, the sealing portion may include a terrace portion T from which the electrode E is drawn, and may be formed on both sides of the bare cell C in addition to the terrace portion T.

The protection module package 100, which is electrically connected to the bare cell C, may be mounted on the terrace portion T of the bare cell C. The protection module package 100 may be electrically connected to the bare cell C to form a path for a charge/discharge current of the bare cell C, and may perform a protection operation for preventing overheating or explosion caused by the overheating, overcharging, overdischarging, or the like of the bare cell C.

The protection module package 100 may include an insulating body 101, an input/output terminal 105 exposed to an upper surface 101a of the insulating body 101, a tab bridge B exposed to a side surface 101c of the insulating body 101 and electrically connected to the bare cell C, and a circuit portion 110 in the insulating body 101 and electrically connecting the input/output terminal 105 to the tab bridge B.

The tab bridge B may be is electrically connected to the electrode E of the bare cell C. The tab bridge B may include first and second tab bridges B1 and B2 that are respectively electrically connected to the first and second electrodes E1 and E2 of the bare cell C.

The tab bridge B may be exposed to the side surface 101c of the insulating body 101. The tab bridge B may be arranged to face the terrace portion T of the bare cell C while being bent to surround the lower surface 101b of the insulating body 101. The tab bridge B may overlap, on the terrace portion T, a portion of the electrode E that is drawn from the terrace portion T and bent so as to be folded onto the terrace portion T. The tab bridge B and the electrode E may be respectively formed of metal, and portions of the tab bridge B and the electrode E overlapping each other may be connected together through welding or the like.

Referring to FIGS. 3A, 3B, and 4, the protection module package 100 may include the insulating body 101, an input/output terminal 105 exposed to the upper surface 101a of the insulating body 101, the tab bridge B exposed to the side surface 101c of the insulating body 101 and electrically connected to the bare cell C, and the circuit portion 110 buried in the insulating body 101 and electrically connecting the input/output terminal 105 to the tab bridge B.

The insulating body 101 may include a molded body of an insulating polymer resin. The insulating body 101 may form a package that surrounds the circuit portion 110 and insulates and protects the circuit portion 110 from an external environment. In an example embodiment, the circuit portion 110 may be buried in the insulating body 101. According to an example embodiment, the circuit portion 110 and the insulating body 101 as a package insulating and protecting the circuit portion 110 may be integrally formed to provide the protection module package 100 in which the circuit portion 110 and the package surrounding the circuit portion 110 are integrated into one component. For example, the protection module package 100 may be formed by insert injection molding, and accordingly, the circuit portion 110 and the insulating body 101 surrounding the circuit portion 110 may be integrated into one component.

The insulating body 101 may include the upper surface 101a on which the input/output terminal 105 is formed, the lower surface 101b formed opposite the upper surface 101a, and the side surface 101c connecting the upper surface 101a to the lower surface 101b and forming a circumference of the insulating body 101.

For reference, throughout the disclosure, the upper surface, the lower surface, and the side surface of the protection module package 100 including the insulating body 101 and the upper surface, the lower surface, and the side surface of a middle block M that is a portion of the insulating body 101 will be respectively given the same reference numerals as the upper surface 101a, the lower surface 101b, and the side surface 101c of the insulating body 101.

The upper surface 101a and the lower surface 101b of the insulating body 101 may be formed substantially parallel to each other. The lower surface 101b of the insulating body 101 may face the terrace portion T of the bare cell C, and may not be exposed to the outside of the secondary battery. The upper surface 101a of the insulating body 101 may be exposed to the outside of the secondary battery. The input/output terminal 105 may be connected to a flexible circuit board 150, e.g., a flexible printed circuit board, forming an electrical connection with an external load or an external charger, and may be exposed to the upper surface 101a of the insulating body 101.

The insulating body 101 may include a middle block M, where the input/output terminal 105 is formed, and a pair of side blocks S arranged on both sides of the middle block M. The middle block M and the side block S may be spaced apart from each other instead of being directly connected to each other, and may be connected to each other by the tab bridge B therebetween. Thus, although the middle block M and the side block S forming the insulating body 101 are spaced apart from each other, the protection module package 100 may not be divided into different separate components according to the spacing between the middle block M and the side block S because the middle block M and the side block S may be connected to each other through the tab bridge B. Thus, the protection module package 100 may be modularized into one component unit instead of being divided into separate components.

The structure in which the insulating body 101 includes the middle block M and the side block S spaced apart from each other may contribute to preventing a distortional deformation caused by a sudden temperature change in the molding process of the insulating body 101. For example, in the molding of the insulating body 101, a polymer resin melted at high temperature may be injected into a mold and an insulating body 101 having a certain shape may be obtained through demolding. Upon cooling, the shape of the insulating body 101 may be distorted and deformed due to the volume contraction of a cooled polymer resin. For example, the shape of the insulating body 101 may be distorted while being maximally contracted along the lengthwise direction that is the longest dimension. According to an example embodiment, the middle block M and the side block S are formed as a divided structure spaced apart from each other rather than being formed as one completelyconnected block. Thus, the insulating body 101 may be effectively suppressed from being deformed due to the volume contraction caused by a sudden temperature change in the molding process. Because at least the middle block M and the side block S are spaced apart from each other, they may not affect each other due to the volume contraction and may restrict the range of deformation due to the volume contraction.

The side block S may include a first side block S1 and a second side block S2 respectively arranged on both sides of the middle block M. The first and second side blocks S1 and S2 may be arranged along the lengthwise direction of the insulating body 101 and each may be spaced apart from the middle block M with a gap g therebetween. As described in further detail below, the middle block M and the first side block S1 may be connected by the first tab bridge B1, and the middle block M and the second side block S2 may be connected by the second tab bridge B2.

The tab bridge B may structurally connect the middle block M to the side block S and may also electrically connect the bare cell C to the protection module package 100. Thus, the tab bridge B may be formed of an electrical conductor to structurally connect the middle block M and the side block S spaced apart from each other through a gap g, thereby modularizing the protection module package 100 into one component unit. Also, the tab bridge B may electrically connect the bare cell C to the protection module package 100, thereby forming a charge/discharge path connecting the bare cell C to the external load or the bare cell C to the external charger.

The tab bridge B may include a portion buried in the insulating body 101, and another portion of the tab bridge B may be exposed from the insulating body 101. For example, the tab bridge B may include a fixing piece Ba fixed to the insulating body 101 and a connection piece Bb that is bent from the fixing piece Ba. The connection piece Bb may be connected to the, e.g., electrode E, of the bare cell C. The fixing piece Ba may extend across the insulating body 101 along a direction parallel to the upper surface 101a or the lower surface 101b between the upper surface 101a and the lower surface 101b of the insulating body 101. The connection piece Bb may be bent from the fixing piece Ba and connected to the bare cell C across the side surface 101c of the insulating body 101 while extending in a direction substantially parallel to the side surface 101c of the insulating body 101. The fixing piece Ba may be mostly buried in the insulating body 101, and the connection piece Bb may be exposed from the insulating body 101. For example, the fixing piece Ba may be mostly buried in the insulating body 101 while extending across the middle block M and the side block S of the insulating body 101 and may include a portion exposed through the gap g between the middle block M and the side block S.

The connection piece Bb may be connected to the bare cell C, and the connection piece Bb and the electrode E of the bare cell C may be connected to each other through laser welding or the like. The connection piece Bb may be exposed to the side surface 101c of the insulating body 101 while being bent from the fixing piece Ba buried in the insulating body 101. The connection piece Bb may be arranged to face the terrace portion T of the bare cell C while being bent to surround the lower surface 101b of the insulating body 101 across the side surface 101c of the insulating body 101. The connection piece Bb may be arranged to overlap the electrode E of the bare cell C on the terrace portion T. Thus, the connection piece Bb and the electrode E of the bare cell C may be connected to each other while overlapping each other on the terrace portion T of the bare cell C.

The tab bridge B may include first and second tab bridges B1 and B2 that are respectively connected to the first and second electrodes E1 and E2 of the bare cell C that are different from each other, e.g., having different polarities. The first and second tab bridges B1 and B2 may be spaced apart from each other along the lengthwise direction of the insulating body 101, the first tab bridge B1 may connect the middle block M to the first side block S1 while extending across between the middle block M and the first side block S1 of the insulating body 101, and the second tab bridge B2 may connect the middle block M to the second side block S2 while extending across between the middle block M and the second side block S2 of the insulating body 101.

The tab bridge B may be electrically connected to the input/output terminal 105 through the circuit portion 110 buried in the insulating body 101. The circuit portion 110 may form a charge/discharge path between the tab bridge B and the input/output terminal 105. The circuit portion 110 may include a circuit board 111 and circuit elements 115 mounted on the circuit board 111. A conductive pattern (not illustrated), forming a charge/discharge path between the tab bridge B and the input/output terminal 105, may be formed on the circuit board 111.

The circuit element 115 may include a protection element arranged on the charge/discharge path. For example, the protection element may include a variable resistor reacting to the ambient temperature and may limit or interrupt a charge/discharge current according to the ambient temperature. In another implementation, the protection element may be provided as a switch element capable of opening/closing the charge/discharge path by being turned on or turned off according to a control signal. For example, the circuit element 115 may include, in addition to the protection element, a controller in the form of a chip that outputs a control signal to the protection element.

The input/output terminal 105 may be formed at a central position of the protection module package 100, and the structure of the protection module package 100 including the input/output terminal 105 may be formed symmetrically with respect to the central position of the protection module package 100. Thus, arranging the input/output terminal 105 at the central position of the protection module package 100 and forming the structure of the protection module package 100 symmetrically with respect to the central position of the protection module package 100 may be for the design of a common component applicable to secondary batteries of different sizes. When the structure of the protection module package 100 including the input/output terminal 105 is designed in an asymmetrical form with respect to the central position thereof, redesign may be required according to a change in size. Unlike this, in the present example embodiment, because the structure of the protection module package 100 including the input/output terminal 105 is formed symmetrically with respect to the central position thereof, dimension adjustment may be made according to a change in size but separate redesign other than dimension adjustment may be avoided. Thus, the input/output terminal 105 may be formed at the central position of the protection module package 100 and, e.g., may be formed at the middle block M formed at the center of the insulating body 101. For example, the input/output terminal 105 may be formed at the middle block M and may not extend to the side block S.

The circuit portion 110 may be formed to be located mainly on the middle block M in the insulating body 101.

For example, the input/output terminal 105 may be formed at the middle block M, and the circuit board 111 connected to the input/output terminal 105 may also be formed in the middle block M and may not extend to the side block S across the middle block M. For example, in an example embodiment, the configuration extending to the side block S across the middle block M may correspond to the tab bridge B, and a component forming a charge/discharge path may not be arranged in the side block S except the tab bridge B.

As described above, the circuit portion 110 may be mainly arranged at the middle block M in the insulating body 101, and the middle block M may protect and insulate the circuit portion 110 from the external environment. Moreover, the side block S may protect the circuit portion 110 in the middle block M from an external impact on both sides of the middle block M. For example, the side block S may be arranged on both edges of the middle block M to protect against a drop impact, and may protect the circuit portion 110 in the middle block M such that the circuit portion 110 may not be directly shocked by a drop impact. Also, the circuit portion 110 may not be formed in the side block S to which an external impact may be directly applied.

Referring to FIG. 4, the insulating body 101 may have a variable thickness along the lengthwise direction of the insulating body 101. Thus, the middle block M and the side block S forming the insulating body 101 may respectively include thick portions Ma and Sa having a relatively large thickness and thin portions Mb and Sb having a relatively small thickness along the lengthwise direction of the insulating body 101. For example, the middle block M and the side block S may include thin portions Mb and Sb of a relatively small thickness at a position overlapping with the tab bridge B (e.g., the connection piece Bb), and may include thick portions Ma and Sa of a relatively large thickness at a position different from the tab bridge B (e.g., the connection piece Bb). The middle block M and the side block S may guide the bending of the tab bridge B (e.g., the connection piece Bb) through a step between the thin portions Mb and Sb and the thick portions Ma and Sa. Thus, the tab bridge B (e.g., the connection piece Bb) may be exposed to the side surface 101c of the insulating body 101 and arranged to face the terrace portion T of the bare cell C while being bent to surround the lower surface 101b of the insulating body 101, and a step between the thin portions Mb and Sb and the thick portions Ma and Sa may be formed on the lower surface 101b of the insulating body 101 to guide the bending of the tab bridge B (e.g., the connection piece Bb). Thus, the middle block M and the side block S may include thin portions Mb and Sb of a relatively small thickness at a position overlapping with the tab bridge B (e.g., the connection piece Bb) and may include thick portions Ma and Sa of a relatively large thickness at other positions. Thus, the thin portion Mb of the middle block M and the thin portion Sb of the side block S may correspond to a point where the tab bridge B (e.g., the connection piece Bb) is connected, and the thin portion Mb of the middle block M and the thin portion Sb of the side block S where the tab bridge B (e.g., the connection piece Bb) is connected may be formed at adjacent positions.

As described above, the middle block M may include a central thick portion Ma formed with a relatively large thickness and a pair of thin portions Mb formed with a relatively small thickness on both sides of the thick portion Ma. The input/output terminal 105 may be formed at the thick portion Ma of the middle block M. The tab bridge B (e.g., the connection piece Bb) may be connected to the thin portion Mb of the middle block M. The thin portion Mb of the middle block M may be connected to the side block S through the tab bridge B (e.g., the connection piece Bb) and may be formed at a position adjacent to the side block S.

The side block S may include a thin portion Sb to which the tab bridge B (e.g., the connection piece Bb) is connected and which is formed with a relatively small thickness, and may include a thick portion Sa of a relatively large thickness outside the thin portion Sb. The thin portion Sb of the side block S may be connected to the middle block M through the tab bridge B (e.g., the connection piece Bb) and may be formed at a position adjacent to the middle block M. The thick portion Sa of the side block S may be formed at an outer portion of the side block S along the lengthwise direction of the insulating body 101 and may be formed with a relatively large thickness corresponding to a point to which an external impact may be directly applied. A recess R for avoiding a dog ear DE (see FIG. 1) of the bare cell C may be formed at an outer end of the side block S. The recess R avoid a physical interference with the dog ear DE forming a thickness on the terrace portion T when a sealing portion is folded at the corner of the terrace portion T, and may be formed at each of the outer ends of the first and second side blocks S1 and S2.

As described above, the insulating body 101 may include the upper surface 101a where the input/output terminal 105 is formed and the lower surface 101b that is opposite to the upper surface 101a. In the present example embodiment, the lower surface 101b of the insulating body 101 may include a concave-convex uneven shape, thereby forming a variable thickness. For example, the thick portions Ma and Sa of the middle block M and the side block S may be formed with a relatively large thickness and may include a lower surface 101b of a protruding shape, as compared to the thin portions Mb and Sb of a relatively small thickness.

Referring to FIGS. 5 and 6, the upper surface 101a of the insulating body 101 may be formed to be substantially flat, and the flexible circuit board 150 connected to the input/output terminal 105 may be supported on the flat upper surface 101a of the insulating body 101. Thus, the upper surface 101a of the insulating body 101 may be formed to be substantially flat and may have a concave upper surface 101a at a position where the input/output terminal 105 is formed. This may help alignment with the flexible circuit board 150 arranged on the upper surface 101a of the insulating body 101. In order to align the connection position between the input/output terminal 105 and the flexible circuit board 150, the upper surface 101a of the insulating body 101 or the upper surface 101a of the middle block M may be concavely recessed at a position where the input/output terminal 105 is formed. A portion where a conductive recess 151 of the flexible circuit board 150 connected to the input/output terminal 105 is formed may also be bent in a concave shape.

The flexible circuit board 150 may be arranged on the upper surface 101a of the insulating body 101, and the conductive recesses 151 of the flexible circuit board 150 and the input/output terminal 105 (aligned with each other along the vertical direction) may be coupled to each other through soldering, welding, or the like. For example, a soldering material 160 may be located between the conductive recess 151 of the flexible circuit board 150 and the input/output terminal 105 to electrically connect them together. The flexible circuit board 150 may include one side where the conductive recess 151 is formed and another side where a connector 152 is formed. An external load or an external charger may be connected to the connector 152.

A coupling member 180 for binding to the insulating body 101 may be formed between one side of the flexible circuit board 150 where the conductive recess 151 is formed and the other side thereof where the connector 152 is formed. The coupling member 180 may surround the flexible circuit board 150 together with the insulating body 101 to firmly couple the flexible circuit board 150 onto the insulating body 101 such that the flexible circuit board 150 may not be separated from the insulating body 101 or may not flutter. For example, a PET tape, a double-sided tape, a thermosetting adhesive, or the like may be applied as the coupling member 180 and may be formed at the side block S of the insulating body 101.

Referring to FIG. 7, a modification hole B' may be formed at a portion located at the gap g between the middle block M and the side block S in the tab bridge B, e.g., each of the tab bridges B1, B2, at a portion that extends across the middle block M and the side block S of the insulating body 101. The modification hole B' may help prevent the middle block M or the side block S from being damaged if a torsional moment is transmitted between the middle block M and the side block S through the tab bridge B. Thus, if a torsional moment acts on the insulating body 101 to which the tab bridge B is fixed, the middle block M or the side block S forming the insulating body 101 may not be deformed while rotating integrally. Thus, because the tab bridge B extending across the gap g between the middle block M and the side block S may be bent and such a bending deformation may be transmitted between the middle block M and the side block S in the form of a torsional moment to cause damage to the middle block M or the side block S, the modification hole B' may be formed in the tab bridge B (e.g., the fixing piece Ba of the tab bridge B) located at the gap g between the middle block M and the side block S to suppress the transmission of the torsional moment. The modification hole B' may allow the tab bridge B between the middle block M and the side block S to be easily bent such that the bending deformation of the tab bridge B may not be transmitted in the form of a torsional moment. The modification hole B' may be formed in, e.g., a diamond shape.

In another example embodiment, as a configuration for suppressing the transmission of the torsional moment between the middle block M and the side block S, a curved portion RS may be formed at a position where the middle block M and the side block S face each other. For example, respective curved portions RS may be formed at corners of a first side portion L1 of the middle block M and corners of the side block S that face each other. Curved portion RS may smoothly connect the first side portion L1 and a second side portion L2 of the middle block M. Curved portion RS may smoothly connect side portions L1 and L2 of the side block S that are adjacent to each other. For example, the first and second side portions L1 and L2 may correspond to a short-side portion and a long-side portion of the middle block M and the side block S.

The curved portion RS may be formed at the corner of the first side portion L1 of the middle block M and the side block S capable of relatively strongly transmitting a torsional moment, thereby alleviating the torsional moment transmitted through the corner of the first side portion L1. In an example embodiment, the curved portion RS may be formed along an arc shape having a certain curvature radius R (indicated by a solid line in FIG. 7). In another example embodiment, in order to effectively suppress the torsional moment, the curved portion RS may be formed to deeply recessed toward the second side portion L2 at the corner where the first and second side portions L1 and L2 contact each other. The curved portion RS may smoothly connect the first side portion L1 where the middle block M and the side block S face each other to the second side portion L2 adjacent to the first side portion L1. With respect to an intersection point O formed on an extension line of the first side portion L1 and the second side portion L2, a distance d2 from the intersection point O to the second side portion L2 may be longer than a distance d1 from the intersection point O to the first side portion L1.

FIGS. 8 and 9 are views for describing the structure of the flexible circuit board 150.

Referring to FIGS. 8 and 9, the flexible circuit board 150 connected to the input/output terminal 105 may be arranged on the upper surface 101*a* of the insulating body 101. The flexible circuit board 150 may extend from one side of the input/output terminal 105 to another side of the input/output terminal 105 across the input/output terminal 105 along the lengthwise direction of the insulating body 101. In the present example embodiment, a conductive pattern 155 connected to the input/output terminal 105 may be formed on one side of the input/output terminal 105, and a charge/discharge current may be communicated through the conductive pattern 155 and may be input/output to the external load or the external charger through the connector 152 of the flexible circuit board 150. The conductive pattern 155 may extend, e.g., across a thick portion Ma of the middle block M where the input/output terminal 105 is formed and a thin portion Mb on one side of the thick portion Ma.

The flexible circuit board 150 may include a dummy pattern 158 that is not connected, e.g., electrically, to the input/output terminal 105 on the other side of the input/output terminal 105 and does not communicate a charge/discharge current or an electrical signal. The dummy pattern 158 may be arranged on the thin portion Mb on the other side with respect to the thick portion Ma of the middle block M where the input/output terminal 105 is formed. Thus, with respect to the input/output terminal 105 or the thick portion Ma where the input/output terminal 105 is formed, the conductive pattern 155 may be arranged on the thin portion Mb on one side and the dummy pattern 158 may be arranged on the thin portion Mb on the other side. The conductive pattern 155 may form a charge/discharge path, whereas the dummy pattern 158 may not have an electrical function and may function as a heat dissipation plate of the middle block M. For example, the dummy pattern 158 may be arranged on the middle block M to function as a heat dissipation plate of the circuit portion 110 buried in the middle block M. As described above, the conductive pattern 155 and the dummy pattern 158 of the flexible circuit board 150 may have different functions from each other, and may be formed in a disconnected shape instead of being connected to each other. For example, the dummy pattern 158 may be formed in an isolated shape that does not form an electrical connection with other components including the conductive pattern 155.

The flexible circuit board 150 may include a first sheet 150*a* at a position facing the insulating body 101, and may include a second sheet 150*b* opposite to the insulating body 101. In an example embodiment, the connector 152, the conductive pattern 155, and the dummy pattern 158 may be formed at the first sheet 150*a*, and the conductive recess 151 may be formed at the second sheet 150*b*. The first sheet 150*a* may include an insulating sheet (not illustrated) located therebetween with respect to the insulating body 101. The conductive pattern 155 may form a charge/discharge path and may be covered with an insulating sheet (not illustrated) for electrical insulation. For example, an insulating sheet (not illustrated) may be located between the conductive pattern 155 and the insulating body 101 and the tab bridge B. Although not electrically short-circuited through the insulating body 101, in order to block a short circuit with a conductive member such as the tab bridge B exposed from the insulating body 101, an insulating sheet (not illustrated) may be located between the conductive pattern 155 and the insulating body 101 and the tab bridge B.

The dummy pattern 158 may be formed in an isolated shape without having an electrical function and may function as a heat dissipation plate of the circuit portion 110. Thus, the dummy pattern 158 may not be covered by an insulating sheet for intimate thermal contact with the circuit portion 110. For example, an insulating sheet may be excluded between the dummy pattern 158 and the insulating body 101, and an opening OP for exposing the dummy pattern 158 may be formed in the insulating sheet. In the present example embodiment, the insulating sheet may be excluded to reduce the thermal resistance between the dummy pattern 158 and the insulating body 101 (e.g., the middle block M). In an example embodiment, the opening OP in the insulating sheet may expose at least a portion of the dummy pattern 158. The insulating sheet may extend across the conductive pattern 155 along the lengthwise direction of the flexible circuit board 150 and may be formed with the opening OP that exposes the dummy pattern 158 at a position where the dummy pattern 158 is formed. At least a portion of the dummy pattern 158 and the middle block M (e.g., the thin portion Mb of the middle block M) may directly face each other through the opening OP of the insulating sheet.

A plurality of through holes 158' may be perforated in the dummy pattern 158. The through holes 158' may form a heat dissipation path in the dummy pattern 158 and may increase the surface area of the dummy pattern 158. For example, the through holes 158' may be formed on the side of the first sheet 150a of the flexible circuit board 150 and may not be formed on the side of the second sheet 150b considering the possibility of penetration by external foreign substances. The through holes 158' may be formed in a matrix pattern arranged in a row direction Z1 and a column direction Z2 along a lengthwise direction of the flexible circuit board 150 and a widthwise direction perpendicular to the lengthwise direction. In an example embodiment, a group of through holes 158' may be arranged in nine rows along the row direction Z1 and in two columns along the column direction Z2.

The interval between adjacent through holes 158' in the row direction Z1 and the interval between adjacent through holes 158' in the column direction Z2 may be set to be equal to each other. For example, the through hole 158' may be formed as a circular hole having a diameter of about 0.15 mm, and the interval between adjacent through holes 158' in the row direction Z1 and the interval between adjacent through holes 158' in the column direction Z2 may be set to be equal to each other to about 0.6 mm. A group of through holes 158' may be formed with a gap of about 1.2 mm from the end of the flexible circuit board 150 and may be arranged over about 4.8 mm along the lengthwise direction of the flexible circuit board 150.

Figure 10:
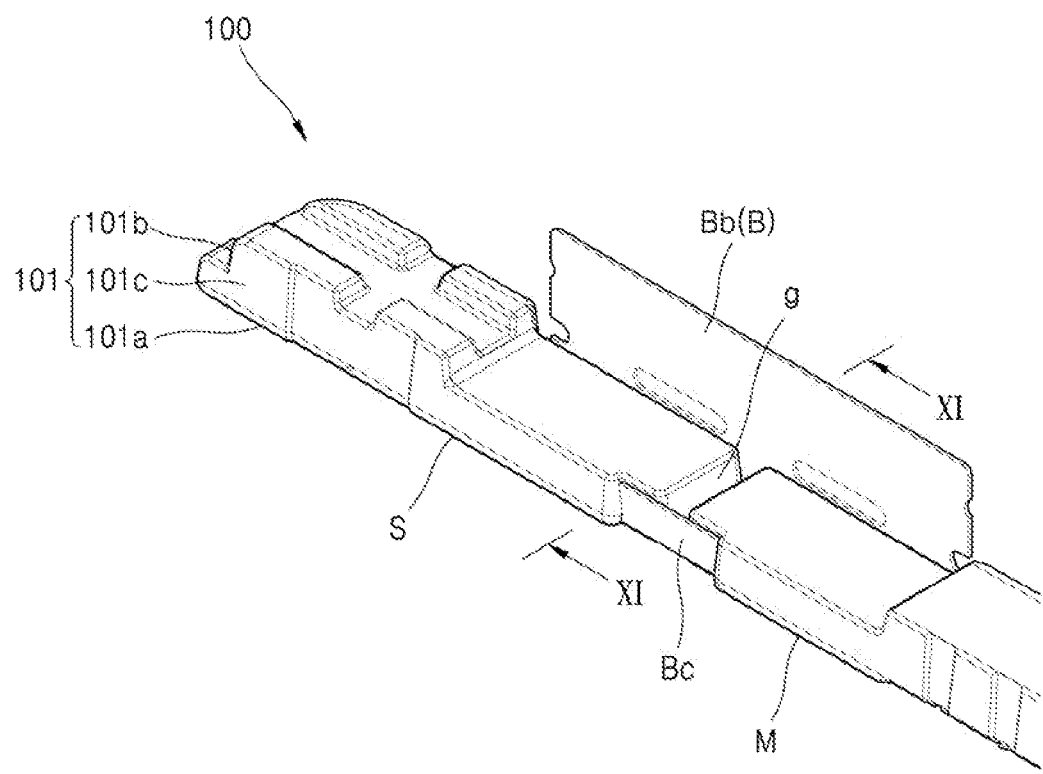
Figure 11:
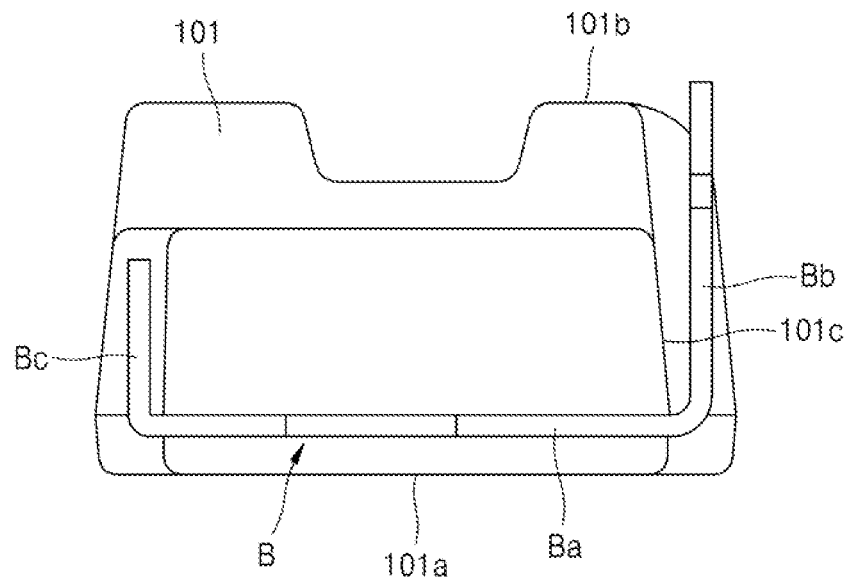

FIGS. 10 and 11 are views for describing a modified embodiment, wherein FIG. 10 is a perspective view of a protection module package and FIG. 11 is a cross-sectional view of the protection module package taken along line XI-XI of FIG. 10.

Referring to FIGS. 10 and 11, the tab bridge B may include the fixing piece Ba extending between an upper surface 101a and a lower surface 101b of an insulating body 101 in parallel to the upper surface 101a or the lower surface 101b. The tab bridge B may include the connection piece Bb that is bent from the fixing piece Ba and extends across a side surface 101c of the insulating body 101.

In the present example embodiment, the tab bridge B may further include a reinforcement piece Bc that opposes the connection piece Bb. The reinforcement piece Bc may be bent from the fixing piece Ba at a side opposite that where the connection piece Bb is bent. The reinforcement piece Bc may extend along an opposite side surface 101c of the insulating body 101, such that it is bent toward the side surface 101c opposite to the connection piece Bb.

The reinforcement piece Bc may form a structure that is bent with respect to the fixing piece Ba and supports the insulating body 101 while forming a structural interference with the insulating body 101 (101b), thereby supplementing the rigidity of the insulating body 101 and effectively suppressing a sagging or bending deformation along the lengthwise direction of the insulating body 101 connected by the tab bridge B. In an example embodiment, the reinforcement piece Bc may be inserted into the side surface 101c of the insulating body 101, and the structural interference with the insulating body 101 may be formed through the insertion coupling. The reinforcement piece Bc may extend across the gap g between the middle block M and the side block S to enhance rigidity. In the gap g between the middle block M and the side block S, a sagging or bending deformation may be effectively suppressed by the rigidity of the reinforcement piece Bc of the tab bridge B. The reinforcement piece Bc may be formed with a short width within the limit of extending across the gap g between the middle block M and the side block S along the lengthwise direction of the insulating body 101, and may be formed with a shorter width than the fixing piece Ba or the connection piece Bb of the tab bridge B.

The reinforcement piece Bc and the connection piece Bb may respectively extend in parallel along opposite side surfaces 101c of the insulating body 101. For example, the reinforcement piece Bc may extend along the side surface 101c located relatively far from the bare cell C, and the connection piece Bb may extend along the side surface 101c located relatively close to the bare cell C. The reinforcement piece Bc may extend relatively short so as not to deviate from the side surface 101c of the insulating body 101, thereby avoiding the electrical interference with the bare cell C. The connection piece Bb may extend relatively long while being bent to surround the lower surface 101b of the insulating body 101 across the side surface 101c of the insulating body 101, thereby being electrically connected to the electrode E of the bare cell C on the terrace portion T of the bare cell C.

In an example embodiment, the reinforcement piece Bc may suppress the bending deformation and may supplement the rigidity of the insulating body 101 through the structural interference with the insulating body 101. The reinforcement piece Bc may be entirely buried in the insulating body 101 or may be partially buried and partially exposed and may form the structural interference with the insulating body 101 in various forms.

Figure 12:
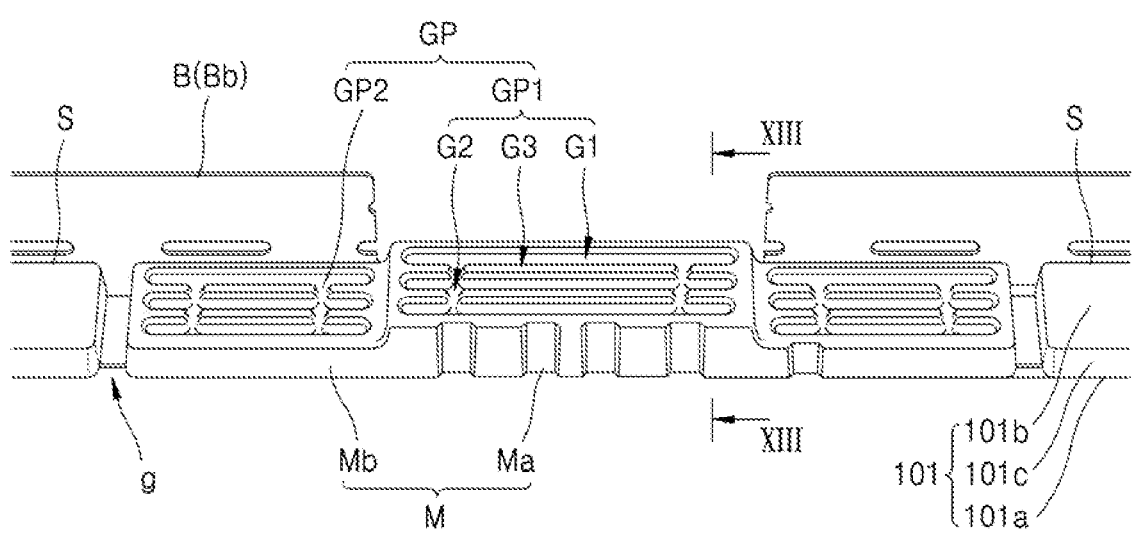
Figure 13:
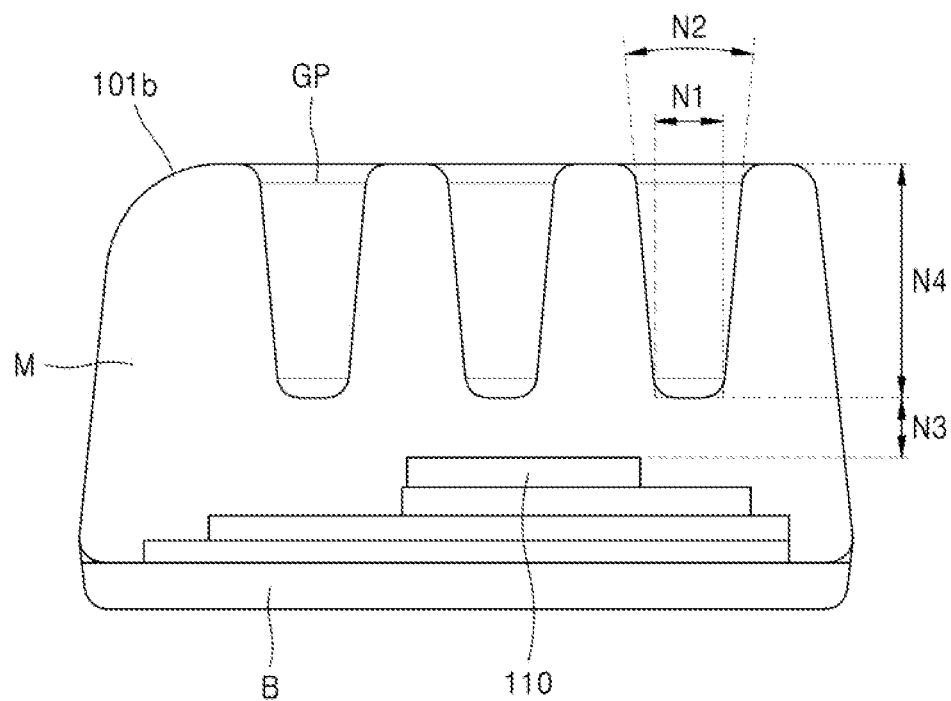

FIGS. 12 and 13 are views for describing a modified embodiment, wherein FIG. 12 is a perspective view of a protection module package and FIG. 13 is a cross-sectional view of the protection module package taken along line XIII-XIII of FIG. 12.

Referring to FIG. 12, an engraved pattern GP engraved from the lower surface 101b to a certain depth may be formed in the middle block M where the circuit portion 110 is arranged. The engraved pattern GP may increase the surface area of the middle block M at the circuit portion 110, and may thus increase the cooling area for the circuit portion 110.

The engraved pattern GP may be formed at the lower surface 101b of the middle block M and may be formed in an engraved shape in a depthwise direction from the lower surface 101b of the middle block M toward the upper surface 101a thereof. The depthwise direction may refer to a direction from the lower surface 101b of the middle block M to the upper surface 101a opposite thereto, or may refer to a direction from the lower surface 101b of the middle block M toward the circuit portion 110. Because the circuit portion 110 may be connected to the input/output terminal 105 and may be arranged on the side of the upper surface 101a of the middle block M where the input/output terminal 105 is formed, the depthwise direction may refer to a direction from the lower surface 101b of the middle block M toward the upper surface 101a thereof or a direction toward the circuit portion 110 on the side of the upper surface 101a.

The engraved pattern GP may be formed at both the thick portion Ma and the thin portion Mb of the middle block M, and may include first and second engraved patterns GP1 and GP2 respectively formed, e.g., separately from each other, at the lower surfaces 101b of the thick portion Ma and the thin portion Mb, which are stepped from each other by being formed with different thicknesses. The first and second engraved patterns GP1 and GP2 may be formed separately from each other by being formed in a disconnected shape instead of being connected to each other.

The first and second engraved patterns GP1 and GP2 may be formed in substantially the same shape. However, because the first and second engraved patterns GP1 and GP2 are respectively formed at the thick portion Ma of a relatively large thickness and the thin portion Mb of a relatively small thickness, the depths of the first and second engraved patterns GP1 and GP2 may be set to be different from each other.

The engraved pattern GP may include, e.g., a plurality of longitudinal portions G1 extending in parallel along the lengthwise direction of the middle block M and a transverse portion G2 extending across the plurality of longitudinal portions G1 in a direction intersecting with the longitudinal portion G1. Also, the engraved pattern GP may include an isolated protrusion G3 surrounded by the longitudinal portion G1 and the transverse portion G2. For example, in an example embodiment, the engraved pattern GP may include three longitudinal portions G1, two transverse portions G2, and two isolated protrusions G3.

Referring to FIG. 13, the engraved pattern GP may be formed in a shape in which the opening width thereof decreases gradually along the depthwise direction, thereby forming an inclined side surface, which may be advantageous for increasing the surface area of the engraved pattern GP. Along the depthwise direction, a smallest opening width N1 of the end of the engraved pattern GP may be set to, e.g., about 0.3 mm, and an angle N2 between both side surfaces of the engraved pattern GP may be set to, e.g., about 10 degrees.

The engraved pattern GP may have an inclined side surface along the depthwise direction such that at least one of the longitudinal portion G1, the transverse portion G2, and the isolated protrusion G3 forming the engraved pattern GP may have an inclined side surface. For example, in an example embodiment, the longitudinal portion G1, the transverse portion G2, and the isolated protrusion G3 may all have an inclined side surface.

The middle block M may have a sufficient thickness of a minimum margin N3 so as to maintain the insulation of the circuit portion 110 without exposing the circuit portion 110 buried in the middle block M. Accordingly, the engraved pattern GP formed in the depthwise direction from the lower surface 101b of the middle block M toward the circuit portion 110 may be formed only to a depth N4 leaving the minimum margin N3 from the circuit portion 110. For example, the engraved pattern GP may be formed to the depth N4 leaving the minimum margin N3 of about 0.2 mm from the circuit portion 110. In the present example embodiment, the depth N4 of the engraved pattern GP may be about 1 mm.

As described above, a circuit portion for forming a charge/discharge path from a bare cell to an input/output terminal and performing a protection operation for the bare cell, and a package for insulating and protecting the circuit portion from an external environment, may be integrated and modularized into one component.

As described above, the structural stability may be improved, the circuit portion may be fully protected even from an external impact such as a drop impact, and a structure advantageous for heat dissipation of the circuit portion may be provided.

As described above, embodiments may provide a secondary battery in which a circuit portion (for forming a charge/discharge path from a bare cell to an input/output terminal and performing a protection operation for the bare cell) and a package (for insulating and protecting the circuit portion from an external environment) may be integrated and modularized into one component.

Embodiments may provide a secondary battery in which structural stability is improved and a circuit portion may be fully protected from an external impact such as a drop impact, and which has a structure advantageous for heat dissipation of the circuit portion.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
a protection module package including a tab bridge, an input/output terminal, and an insulating body that includes a middle block and side block, wherein the side block includes first and second side blocks that are respectively spaced apart from the middle block on a first side of the middle block and on a second side of the middle block that is opposite the first side, the middle block having the input/output terminal therein, the first and second side blocks being spaced apart from the middle block, and the tab bridge being formed of a different material from the insulating body, and the tab bridge including a first tab bridge connecting the middle block to the first side block, and a second tab bridge connecting the middle block to the second side block; and the secondary battery including a bare cell, including electrodes having different polarities, the first and second tab bridges being electrically connected to respective electrodes of the bare cell.

2. The secondary battery as claimed in claim 1, wherein the input/output terminal is disposed at a central position along a lengthwise direction of the protection module package or the insulating body.

3. The secondary battery as claimed in claim 1, wherein the insulating body includes an upper surface with the input/output terminal thereon, a lower surface disposed opposite the upper surface, and a side surface connecting the upper surface to the lower surface and forming a circumference of the insulating body.

4. The secondary battery as claimed in claim 3, wherein the input/output terminal is exposed at the upper surface of the insulating body.

5. The secondary battery as claimed in claim 3, wherein the tab bridge includes:
    a fixing piece extending across the insulating body between the upper surface and the lower surface of the insulating body; and
    a connection piece that is bent from the fixing piece, the connection piece being connected to the electrodes across the side surface of the insulating body.

6. The secondary battery as claimed in claim 5, wherein:
    the connection piece is arranged to overlap the electrodes at a portion of the electrodes that is bent onto a terrace portion of the bare cell, and
    the connection piece is bent to surround the lower surface of the insulating body across the side surface of the insulating body.

7. The secondary battery as claimed in claim 5, wherein the fixing piece includes a portion buried in the insulating body.

8. The secondary battery as claimed in claim 5, wherein the fixing piece is exposed through a gap between the middle block and the side block, and extends across the middle block and the side block.

9. The secondary battery as claimed in claim 5, wherein the tab bridge further includes a reinforcement piece that is bent from the fixing piece toward a side surface of the insulating body that is opposite to the connection piece.

10. The secondary battery as claimed in claim 9, wherein the reinforcement piece extends across a gap between the middle block and the side block.

11. The secondary battery as claimed in claim 9, wherein the connection piece extends longer across the side surface of the insulating body than does the reinforcement piece, and reinforcement piece does not extend beyond the side surface of the insulating body.

12. The secondary battery as claimed in claim 1, wherein the insulating body includes a curved portion, the curved portion being disposed at a corner of a first side portion of the middle block facing the side block, the first side portion and the side block facing each other with a gap defining a space therebetween.

13. The secondary battery as claimed in claim 12, wherein:
    the curved portion smoothly connects the first side portion to a second side portion adjacent to the first side portion, and
    a distance from an intersection point formed on an extension line of the first side portion and the second side portion to the first side portion is shorter than a distance from the intersection point to the second side portion.

14. The secondary battery as claimed in claim 1, wherein:
    a portion of the tab bridge is exposed through a gap between the middle block and the side block, and
    a modification hole for suppressing transmission of a torsional moment between the middle block and the side block is located in the portion of the tab bridge that is exposed through the gap.

15. The secondary battery as claimed in claim 1, wherein a circuit portion forming a charge/discharge path between the tab bridge and the input/output terminal is at least partially buried in the middle block.

16. The secondary battery as claimed in claim 15, wherein a component forming a charge/discharge path is not arranged in the side block except for the tab bridge.

17. The secondary battery as claimed in claim 1, wherein an engraved pattern is formed in the middle block, the engraved pattern being engraved in a depthwise direction from a lower surface opposite to the input/output terminal.

18. The secondary battery as claimed in claim 17, wherein the engraved pattern is formed in the depthwise direction from a lower surface of the middle block toward an upper surface of the middle block where the input/output terminal is formed, or is formed in the depthwise direction from a lower surface of the middle block toward a circuit portion connected to the input/output terminal.

19. The secondary battery as claimed in claim 17, wherein the engraved pattern includes:
    a longitudinal portion extending parallel to a lengthwise direction of the middle block;
    a transverse portion extending across the longitudinal portion in a direction intersecting with the longitudinal portion; and
    an isolated protrusion surrounded by the longitudinal portion and the transverse portion.

20. The secondary battery as claimed in claim 17, wherein the engraved pattern includes an inclined side surface formed as an opening width thereof decreases gradually along the depthwise direction.

21. The secondary battery as claimed in claim 1, wherein the middle block includes:
    a central thick portion in which the input/output terminal is formed and which is formed with a relatively large thickness; and
    a pair of thin portions formed with a relatively small thickness on both sides of the thick portion.

22. The secondary battery as claimed in claim 21, wherein the side block includes:
    a thin portion formed with a relatively small thickness; and
    a thick portion formed with a relatively large thickness outside the thin portion.

23. The secondary battery as claimed in claim 22, wherein:
    a connection piece of the tab bridge is connected to the thin portions of the middle block and the side block, and
    the thin portions of the middle block and the side block are formed at adjacent positions.

24. The secondary battery as claimed in claim 21, wherein:
    the thick portion and the thin portion of the middle block include lower surfaces stepped with respect to each other,
    first and second engraved patterns are formed at the lower surfaces of the thick portion and the thin portion, the first and second engraved patterns being engraved in the depthwise direction in the middle block, and the first and second engraved patterns are disconnected from each other.

25. The secondary battery as claimed in claim 1, further comprising a flexible circuit board arranged on the insulating body and connected to the input/output terminal.

26. The secondary battery as claimed in claim 25, wherein a conductive recess of the flexible circuit board and the input/output terminal are aligned with each other and are electrically connected to each other with a soldering material therebetween.

27. The secondary battery as claimed in claim 25, wherein:

the flexible circuit board extends from one side of the input/output terminal to another side of the input/output terminal so as to cross the input/output terminal along a lengthwise direction of the insulating body, and the flexible circuit board includes:
- a conductive pattern electrically connected to the input/output terminal at one side of the input/output terminal; and
- a dummy pattern not electrically connected to the input/output terminal at another side of the input/output terminal.

28. The secondary battery as claimed in claim 27, wherein:

the middle block includes a centrally located thick portion in which the input/output terminal is disposed and which is formed with a relatively large thickness, the middle block includes a pair of thin portions formed with a relatively small thickness on opposite sides of the thick portion, the conductive pattern extends across one of the thin portions on one side of the thick portion, and the dummy pattern is arranged on the other of the thin portions on another side of the thick portion.

29. The secondary battery as claimed in claim 28, wherein at least a portion of the dummy pattern and a corresponding thin portion directly face each other through an opening of an insulating sheet.

30. The secondary battery as claimed in claim 27, wherein a plurality of through holes are formed in the dummy pattern.

31. A secondary battery, comprising:

a protection module package including a tab bridge, an input/output terminal, and an insulating body that includes a middle block and side block, the middle block having the input/output terminal therein, the side block being spaced apart from the middle block, and the tab bridge connecting the middle block to the side block; and a bare cell including an electrode that is electrically connected to the tab bridge, wherein:

the insulating body includes an upper surface with the input/output terminal thereon, a lower surface disposed opposite the upper surface, and a side surface connecting the upper surface to the lower surface and forming a circumference of the insulating body, and the tab bridge includes:
- a fixing piece extending across the insulating body between the upper surface and the lower surface of the insulating body; and
- a connection piece that is bent from the fixing piece, the connection piece being connected to the electrode across the side surface of the insulating body.

32. A secondary battery, comprising:

a protection module package including a tab bridge, an input/output terminal, and an insulating body that includes a middle block and side block, the middle block having the input/output terminal therein, the side block being spaced apart from the middle block, and the tab bridge connecting the middle block to the side block; and a bare cell including an electrode that is electrically connected to the tab bridge, wherein:

a circuit portion forming a charge/discharge path between the tab bridge and the input/output terminal is at least partially buried in the middle block, and a component forming the charge/discharge path is not arranged in the side block except for the tab bridge.

\* \* \* \* \*